United States Patent [19]

Pedersen

[11] Patent Number: 5,004,032
[45] Date of Patent: Apr. 2, 1991

[54] COVER FOR A LOAD-CARRYING SPACE, PREFERABLY FOR VEHICLES

[76] Inventor: Helge L. Pedersen, Frobjerg DK-5560, Aarup, Denmark

[21] Appl. No.: 357,664

[22] Filed: May 25, 1989

Related U.S. Application Data

[63] Continuation of Ser. No. 163,284, Dec. 23, 1987, abandoned, which is a continuation-in-part of Ser. No. 851,139, Mar. 20, 1986, abandoned.

[30] Foreign Application Priority Data

Jul. 13, 1984 [DK] Denmark .............................. 3597/84

[51] Int. Cl.⁵ .............................................. B60P 7/04
[52] U.S. Cl. .................................... 160/84.1; 296/100
[58] Field of Search ...................... 160/84.1, 195, 264, 160/352; 296/98, 100

[56] References Cited

U.S. PATENT DOCUMENTS

| | | | |
|---|---|---|---|
| 3,756,650 | 9/1973 | Michel | 296/100 |
| 3,975,047 | 8/1976 | McClellan | 296/100 |
| 4,067,603 | 1/1978 | Fenton | 296/100 |
| 4,189,178 | 2/1980 | Cramaro | 296/100 X |
| 4,200,330 | 4/1980 | Scott | 296/100 |
| 4,215,897 | 8/1980 | Aiken et al. | 296/100 |
| 4,261,611 | 4/1981 | Barry et al. | 296/100 |
| 4,265,479 | 5/1981 | Langston | 296/100 |
| 4,725,090 | 2/1988 | Weaver | 296/100 |

FOREIGN PATENT DOCUMENTS

3115926  11/1982  Fed. Rep. of Germany ........ 160/33

*Primary Examiner*—David M. Purol
*Attorney, Agent, or Firm*—Darby & Darby

[57] ABSTRACT

A cover for a load-carrying space comprising a tarpaulin, which mechanically can be drawn across the upwardly open load-carrying space and cover, and which can be removed in order that the load-carrying space is open at the top, the cover comprising supporting strips at intervals being secured to the cover material, which supporting strips reach across the load-carrying space. The supporting strips may, driven by a motor via an endless chain, slide at right angles to their longitudinal direction, controlled in a guide rail at each end of the load-carrying space. A hinge is located in the middle of the guide rails in order that half of the guide rails can be raised by a bellow cylinder, when the cover is to be drawn completely aside. Hereby, a cover of a very simple mechanical construction is obtained, totally insensitive to dirt of any kind. The cover may be operated from the cab of the lorry.

5 Claims, 3 Drawing Sheets

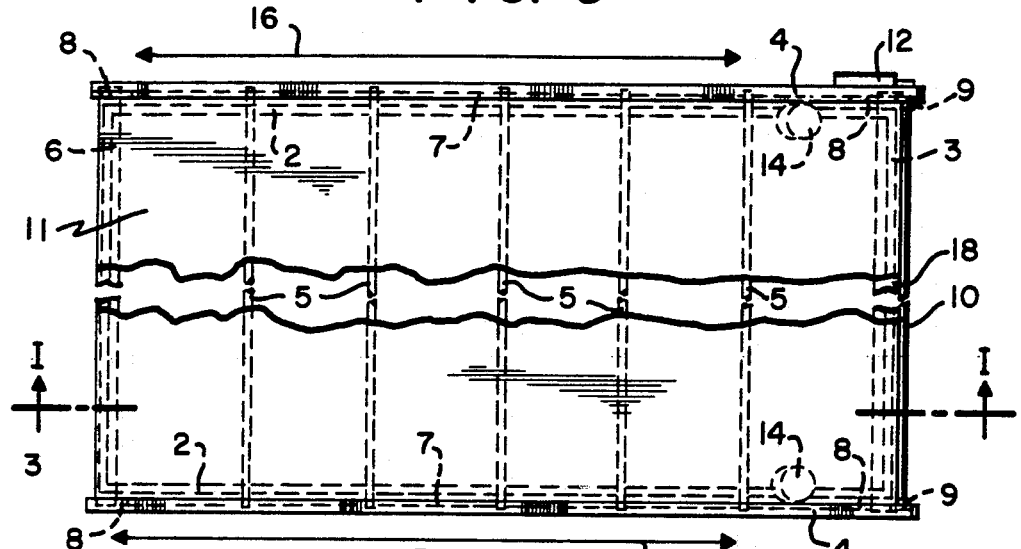
FIG. 3
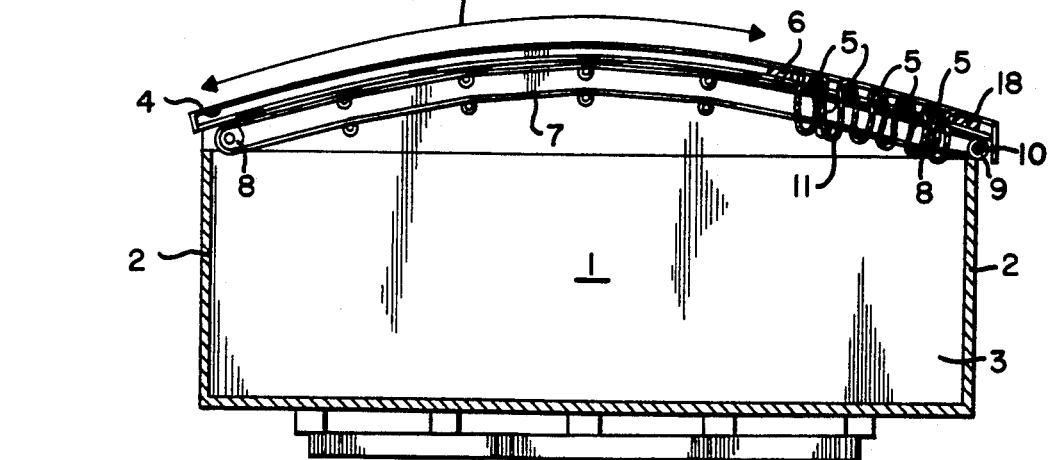
FIG. 4
FIG. 5
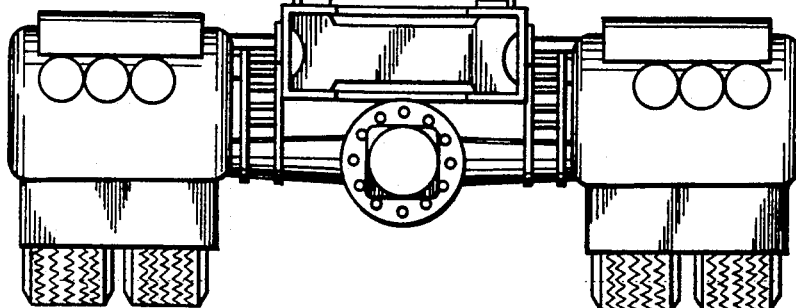

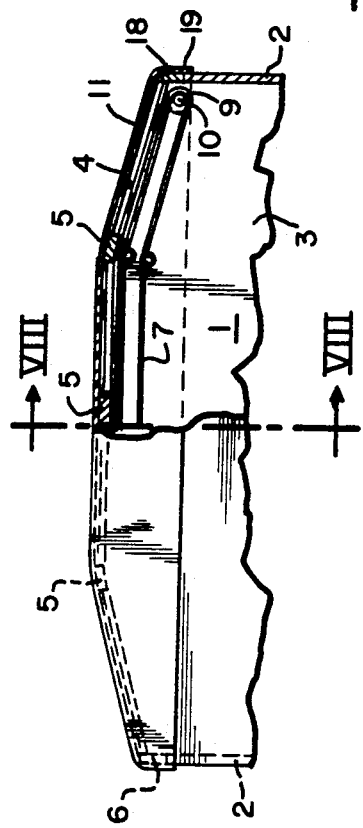
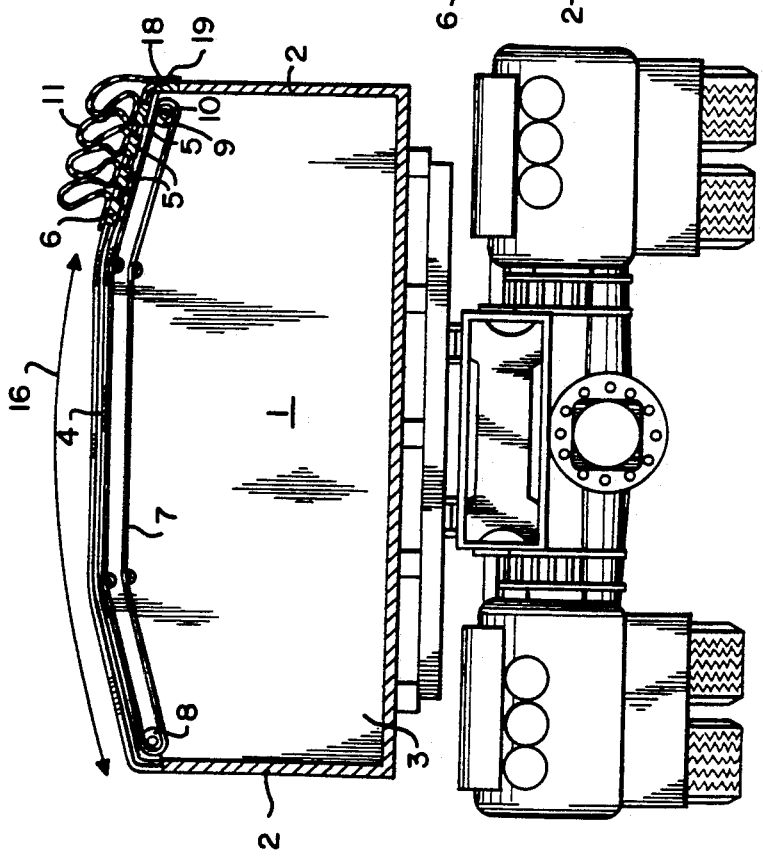
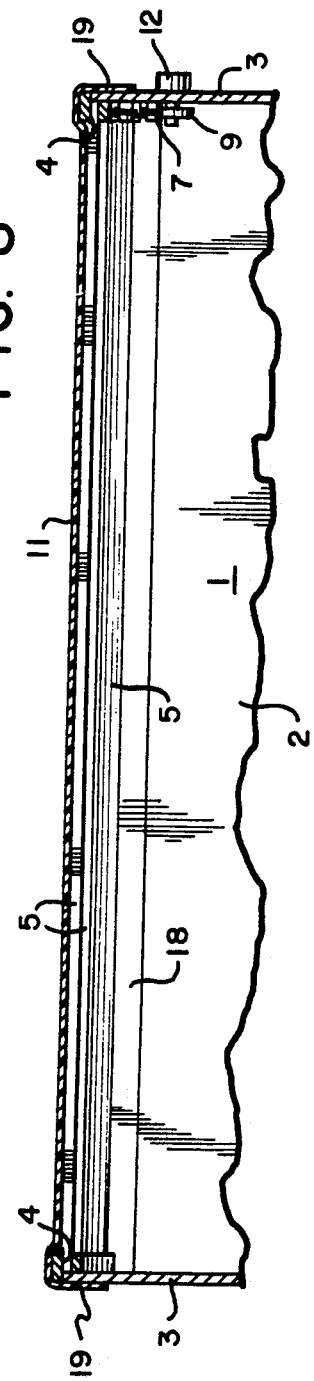

COVER FOR A LOAD-CARRYING SPACE, PREFERABLY FOR VEHICLES

CROSS REFERENCE TO RELATED APPLICATIONS

This is a continuation of application Ser. No. 163,284, filed Dec. 23, 1987, now abandoned which is a CIP of Ser. No. 851,139 filed Mar. 20, 1986 now abandoned.

FIELD OF THE INVENTION

The invention relates to a cover for a load-carrying space, preferably but not exclusively, for vehicles, and as related to in the introductory part of claim 1.

BACKGROUND OF THE PRIOR ART

Many kinds of goods and the like are transported in open vehicles, e.g. in rail wagons or lorries. Goods that tend to raise dust or pollute, such as waste material, ashes and the like, should, however, be covered when tranported through built-up areas. For security reasons, e.g. organic waste should always be carried in covered transportation vehicles. Other products such as hot asphalt and the like, should be covered for several reasons, i.e. both to avoid polluting the surrounding but also to avoid a too high cooling during transportataion. Moreover, live-stock, such as pigs and cattle, transported to the slaughterhouse are normally transported in covered load-carrying spaces.

Thus, to a very large extent vehicles with an upwardly open load-carrying space are used, which at their top are covered by means of a tarpaulin or a similar detachable cover material, as this gives a high degree of flexibility in use. The tarpaulin is removed when the load-carrying space is loaded in order that loading may take place from above by means of a loading device or crane or the like. The tarpaulin is then placed or secured on the top. This is, however, a slow process and, consequently, various means for the mechanical placing and removing of tight fitting tarpaulins have been developed, preferably for lorries or rail goods wagons.

A cover system for lorries is known, wherein a tarpaulin is wound onto a spool-like means in essentially the same manner as a blind. The winding may be manual and operated by means of a handle as it is known from U.S. Pat. No. 2,976,082, or it may be mechanical, e.g. with a spring-motor, as it is known from U.S. Pat. No. 4,380,350. Such a winding system has the great advantage that the tarpaulin takes up only very little spaces when it is draw aside, i.e. when it is rolled up. On the other hand, this construction has the very big disadvantage of being highly sensitive to dust and impurities that easily stick to the bottom side of the tarpaulin. Where moist grain or sand is carried, or what is even worse, asphalt or tar products, the goods will stick to the bottom side of the tarpaulin and may prevent the winding up simply because the tarpaulin becomes too thick. If the rolling up of a tar stained tarpaulin of this sort is successful, it may often be impossible to unwind it again because it sticks together.

From U.S. Pat. No. 4,215,897, a cover system of the above type is known, in which the tarpaulin is moved along the load-supporting deck and joined in an extension over the driver's cab. This is not expedient as much as such a system cannot be fitted on a lorry, which side walls are lower than the height of the driver's cab just as it may cause problems to make room for the tarpaulin on top of the cab so that it does not become dirty if the lorry has a long load-supporting deck, and it gives a long and thus vulnerable travelling distance for the tarpaulin.

Object of the invention according to this application is to provide a cover for a load-carrying space for the mentioned type, comprising a very simple mechanical construction which is completely insensitive to dirt of any kind, and wherein the load-carrying space is completely open at the top when the cover is drawn aside.

SUMMARY OF THE INVENTION

This is achieved by designing the cover as referred to in the characterizing part of claim 1. Hereby a strong and stable cover is obtained, wherein the tarpaulin is carried by a number of supporting strips carrying and holding the tarpaulin when the tarpaulin is drawn across the load-carrying space but also carrying the tarpaulin when this is drawn aside, in that the tarpaulin now hangs down between the individual supporting rails in a wavelike manner.

By the cover according to the invention, it is avoided that the tarpaulin becomes dirty when it is drawn aside, because one part of each guide rail may be turned upwards, in order that the parts of the tarpaulin hanging down between the guide rails do not touch the load, when the drawstrip is placed as referred to in claim 2, and in this way the cover works almost as a flexible sliding roof over the load-carrying space. A short and therefore less vulnerable guide rail is obtained, and the cover may be fitted directly on existing lorries in order to facilitate side as well as back tipping.

If the cover moreover is designed as related to in the characterizing part of claim 3, it is achieved that the cover when drawn aside, always follows a straight course, which requires less motor power from the driving motor.

By designing the cover as related to in the characterizing part of claim 4, an even and parallel guiding of the supporting rails is achieved, and the cover may be designed so as to be operated from a suitable place, e.g. from the driver's cab, if the cover is fitted on a lorry.

By designing the cover as related to the characterizing part of claim 5, the compressed-air or hydraulics system already available in most lorries may be applied for the operating of the cover. An effective power source is thus available, and the operating may be done in only a few seconds.

If the cover is designed as related to in the characterizing part of claim 6, the turning of the rail part may also be operated by means of compressed air or hydraulic pressure, in order that also this part of the operation may be controlled from the driver's cab of the lorry.

BRIEF DESCRIPTION OF THE DRAWINGS

The invention is explained in further detail with reference to the drawing showing two different embodiment according to the invention, wherein:

FIG. 3 shows a load-carrying space seen from above and covered by a cover according to the invention;

FIG. 4 shows a plane section in another embodiment of the invention, in which the cover is drawn across the load-carrying space;

FIG. 5 shows the same as FIG. 4, but with the cover drawn aside;

FIG. 6 illustrates a plane section in a variation of the embodiment shown in FIG. 4;

FIG. 7 illustrates a view similar to that shown in FIG. 1 with reference to FIG. 6; and FIG. 8 is a partial view along VIII—VIII of FIG. 7.

Figure 2:
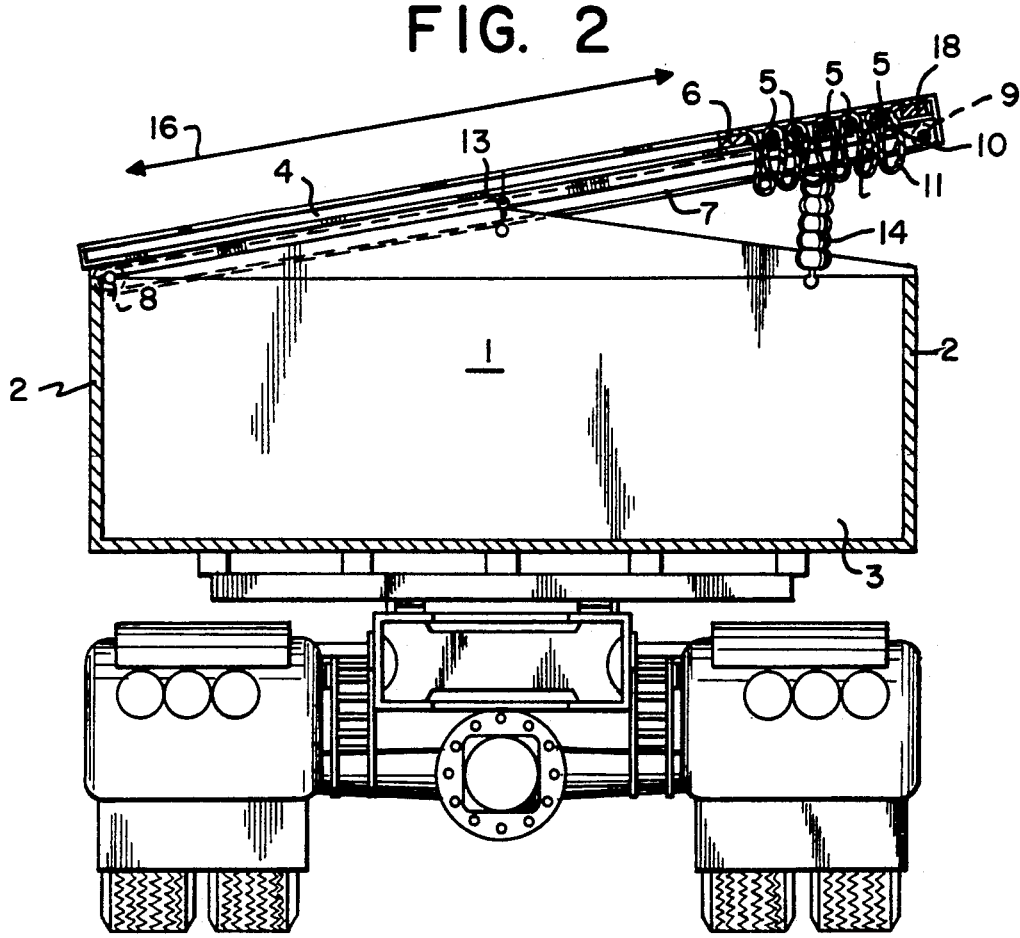
FIG. 2 shows the same as FIG. 1, but with the tarpaulin drawn aside.

In the two embodiments shown in the drawing, the same reference numbers are applied for the same parts. A load-carrying space 1 is for instance the load-carrying space of a lorry, as shown in FIG. 2, or any other type of load-carrying space such as a goods wagon or the like. The load-carrying space has a bottom and two lengthwise side slaps 2, and two end walls or slabs 3.

At each end wall 3 a guide rail 4 is placed, e.g. a U-shaped profile rail with opposite openings. Between these the cover 11 is placed. The guide rails 4 may of course also be placed on the two side slaps. The cover 11, which for instance may be an ordinary reinforced plastic tarpaulin, is attached at regular intervals to supporting strips 5, reaching across the load-carrying space 1, and at each end sliding in the guide rails. At one of the long slides a driving shaft 10 is mounted, which may be driven by a motor 12 e.g. a compressed-air or a hydraulic motor. At each wall 3 is mounted a driving wheel, such as a chain wheel 9 on the driving shaft 10, driving two endless chains 7, one at each end wall. The chain 10 is secured to that of the support rails 6, which is furthest to the front of the tarpaulin, the rear edge of the tarpaulin being secured to an edge strip 18 between the two guide rails 4.

Figure 1:
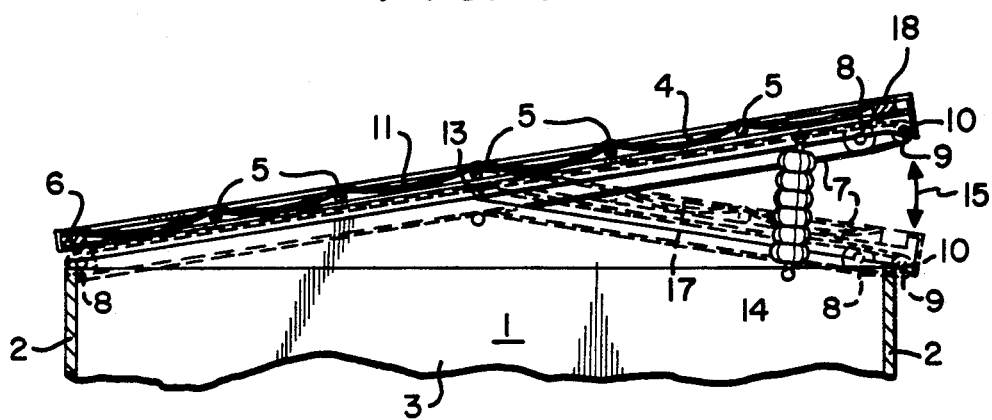
FIG. 1 shows a plane section in a preferred embodiment of the invention, which section is made along the line I—I in FIG. 3.

In the embodiment according to FIGS. 1–3, the cover consists of two essentailly plane parts forming a roof across the load-carrying space 1. In the position in FIG. 1, where the right part of the cover is in its lowest position, the guide rail halves 17 carry half of the roof. When the cover is to be drawn aside, the part 17 is raised by means of a bellow cylinder 14 at each side, cf. the double arrow 15. The driving motor 12 is then started, and the chains 7 running in each their guide rail via the chain wheels 8, drawn the foremost supporting rail, the drawrail 6, to the right until the cover of the tarpaulin is shown in FIG. 2. The covering takes place in reverse order. i.e. by first drawing the tarpaulin across the load-carrying space 1, and secondly by lowering half of the cover by means of a bellow cylinder 14, the guide rails 4, 17 being pivotal around a hinge 13. It will appear that the parts of the tarpaulin hanging down normally will not touch the load in the load-carrying space 1, neither when the cover is drawn across, nor when it is drawn aside.

FIGS. 4 and 5 show and embodiment of the invention with an arched cover over the load-carrying space, whereby the hinge construction 13 in FIGS. 1 and 2, and the operating cylinders 14 are avoided. In return, the parts of the tarpaulin hanging down in FIG. 4 may touch the load in the load-carrying space 1.

The cover may be drawn fully aside, i.e. both the tarpaulin 11 and the supporting strips 5 and 6 are drawn completely aside, cf. the double arrow 16. Thus, the load-carrying space 1 becomes fully open at the top and easy to load, e.g. by a crane or a similar machine, such as an excavator.

It is obvious that the side walls 2 and one or both end walls 3 can be hinged at the top in a generally known manner, in order that the load-carrying space 1 for instance may be the load-supporting deck of a lorry or a dump body. Thus, e.g. hot asphalt or other warm tar products can be unloaded successively when required, and the cover need not be opened.

With respect to FIGS. 6–8, the following description is presented. In these figures, the reference numbers used are those used in connection with the other figures. Only reference numeral 19 has been added to show an extra tarpaulin part extending on the outside of the end walls 3, thus covering the load-carrying space 1 completely.

This is advantageous in that the load-carrying space 1 is closed completely tight so that the load, which for instance can be feedstuffs, fly dust, fertilizers, or a similar granulation will not blow off while in motion.

Moreover, the tarpaulin 11 will not be liable to flutter, because air cannot get underneath the tarpaulin which will protect it against strong impact while driving, thus preventing it from being torn.

The cover pieces 19 over the end walls 3 are moreover characteristic in that they make the compressed cover material 11 fold upwards, as shown in FIG. 6, whereby the tarpaulin is not exposed to dirt from the load in the load-carrying space 1.

The cover pieces 19 do, in fact, during their expression, exert a pull at the tarpaulin 13 which makes the folds lie across the supporting strips 5, 6.

Moreover, the motor 12 is a unit driven by air which is reliable and furthermore takes up only little space.

Finally, the shape of the top edge of the end walls 3 must be emphasized. The end wall are horizontal in the center portion and in the sides they slop downwarts to the sides 2 of the load-carrying space. This provides a simple construction of the driving chains 7 and their supporting wheels in that the number of wheels can be reduced to four.

With respect to the prior art, certain significant differences exist.

For pulling the tarpaulin, a chain 7 is used instead of a wire. The use of a chain or chain wheel eliminates the risk that the tarpaulin being drawn unevenly so that it would become unsymmetrical or misaligned at the end walls.

This ensures that the tarpaulin is rolled on and off in a completely straight and even manner.

The arched shaped of the top of the tarpaulin is moreover expedient because this prevents snow and water from settling on top of the tarpaulin. While in motion, the occurring wind will blow off snow and water in that the wind blows parallel to the supporting strips 5, 6.

Moreover, the means for drawing itself comprising the guide rails 4, the chain 7, wheel and driving wheel 9 are protected under the tarpaulin which give long life with no need for frequent servicing.

What is claimed is:

1. Cover for a load-carrying space, preferably for vehicles and comprising a flexible cover material adapted to being moved mechanically across an open load-carrying space and to being removed to provide an open load-carrying space, said cover material being secured at intervals to a number of supporting strips having a longitudinal direction extending across the load-carrying space, and said strips capable of sliding at right angles to their longitudinal direction, one supporting strip forming a drawstrip driven by a driving means, the supporting strips at each end being controlled in guide rails, the guide rails adapted to being situated at end wall of the load-carrying space, each guide rail being divided into a first and a second rail part, said first and second rail parts being connected by means of a hinge, the first part of each guide rail, at an end lying most distant from the hinge, adapted being fixed to an upper edge of a first side wall of the load-carrying space such that a longitudinal direction of said first part forms an acute angle to a bottom of the load-carrying space with the hinge being positioned considerably higher up than the side walls of the load-carrying space, means being provided for turning said second part of each guide rail around the hinge between a position where a free end is adapted to abut an upper edge of the other side wall and a position where said second part of each guide rail extends in continuation of said first part, one side edge of the cover material being attached at said free end of the second part of the guide rails, the opposite side edge being attached to the drawstrip, and wherein the drawstrip is placed at the side of the cover material turning toward the first guide rail part and wherein the driving means for drawing are endless chains, driven by a joint driving shaft driven by a motor.

2. Cover according to claim 1, wherein the motor is a fluid-motor.

3. Cover according to claim 1, wherein each second guide rail part is pivoted by an operating means.

4. The cover of claim 1, wherein said first and second rail part of said guide rails are of equal lengths.

5. The cover of claim 3, wherein said opeating means is a bellow cylinder.

* * * * *